(12) United States Patent
Nandula et al.

(10) Patent No.: US 11,429,373 B2
(45) Date of Patent: *Aug. 30, 2022

(54) UPGRADE IMPLEMENTATION OF A VIRTUALIZATION MANAGEMENT SYSTEM

(71) Applicant: VMware, Inc., Palo Alto, CA (US)

(72) Inventors: Ravi Shankar Nandula, Bangalore (IN); Akash Kodenkiri, Bangalore (IN); Ramesh Vepuri Lakshminarayana, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/332,128

(22) Filed: May 27, 2021

(65) Prior Publication Data

US 2021/0294594 A1  Sep. 23, 2021

Related U.S. Application Data

(63) Continuation of application No. 16/364,233, filed on Mar. 26, 2019, now Pat. No. 11,023,219.

(30) Foreign Application Priority Data

Jan. 16, 2019 (IN) .............................. 201941001952

(51) Int. Cl.
*G06F 8/65* (2018.01)
*G06F 9/455* (2018.01)
*G06F 11/14* (2006.01)
*H04L 61/4511* (2022.01)
*H04L 61/5007* (2022.01)

(52) U.S. Cl.
CPC ............... *G06F 8/65* (2013.01); *G06F 9/455* (2013.01); *G06F 11/1451* (2013.01); *H04L 61/1511* (2013.01); *H04L 61/2007* (2013.01); *G06F 2201/80* (2013.01); *G06F 2201/84* (2013.01)

(58) Field of Classification Search
CPC ........ G06F 8/65; G06F 9/455; G06F 11/1451; G06F 2201/80; G06F 2201/84; H04L 61/1511; H04L 61/2007
See application file for complete search history.

(56) References Cited

U.S. PATENT DOCUMENTS

| | | |
|---|---|---|
| 9,292,332 B1 | 3/2016 | Liguori et al. |
| 10,353,733 B1 | 7/2019 | Kommera et al. |
| 2012/0066680 A1 | 3/2012 | Amano et al. |
| 2013/0086582 A1* | 4/2013 | Cardona ............. G06F 9/45558 718/1 |
| 2013/0091376 A1 | 4/2013 | Raspudic et al. |
| 2013/0219156 A1 | 8/2013 | Sears |
| 2014/0201725 A1 | 7/2014 | Tian et al. |

(Continued)

*Primary Examiner* — Wei Y Zhen
*Assistant Examiner* — Amir Soltanzadeh
(74) *Attorney, Agent, or Firm* — Thomas | Horstemeyer, LLP

(57) ABSTRACT

Aspects of updating or upgrading a management system for a virtualized computing environment are described. In some aspects, a virtualization management system that manages a virtualized computing environment can be upgraded or updated with limited downtime of the system by deploying a new instance of the system and subsequently assigning a network address of the previous instance to the new instance once it is deployed in the environment.

18 Claims, 3 Drawing Sheets

(56) References Cited

U.S. PATENT DOCUMENTS

2014/0229944 A1\* 8/2014 Wang .................... G06F 9/5088
                                                                       718/1
2016/0170781 A1    6/2016 Liguori et al.
2019/0095243 A1\* 3/2019 Wu ..................... H04L 41/0803

\* cited by examiner

UPGRADE IMPLEMENTATION OF A VIRTUALIZATION MANAGEMENT SYSTEM

CROSS-REFERENCE TO RELATED APPLICATIONS

This application is continuation of and claims the benefit of U.S. patent application Ser. No. 16/364,233, entitled "UPGRADE IMPLEMENTATION OF A VIRTUALIZATION MANAGEMENT SYSTEM" and filed on Mar. 26, 2019, which is hereby incorporated by reference in its entirety.

BACKGROUND

Cloud computing systems can extend the capabilities of an organization's data center using computing resources such as virtual machines. A virtualized computing environment can include various host devices that are executing virtual machines that perform various tasks for an enterprise. The virtualized computing environment can support a virtual desktop infrastructure, server infrastructure, user authentication services, security systems, or other computing needs and tasks that might be required by an enterprise. The virtualized computing environment can be managed by a virtualization management system that can manage a virtual infrastructure across a public, private, or hybrid cloud environment. The virtualization management system can also orchestrate containerized execution environments that allow an enterprise to deploy or publish applications for its users.

As the scale, scope, and importance of virtualized computing environments increases, downtime of an environment comes with increasing costs. An enterprise might be resistant to experiencing any downtime of the environment. However, upgrading a virtualization management system is periodically necessary. Upgrade of the virtualization management system can introduce new features, fix bugs and errors, and improve the functioning of the system, which can in turn improve the ability of administrators to manage a virtualized computing environment. Therefore improving the upgrade experience of the virtualizing management system can be an important feature of the deployment.

DETAILED DESCRIPTION

Embodiments of this disclosure are directed to upgrading a virtualization management system or server that oversees the operation of a virtualized computing environment. In public, private, or hybrid cloud environments deployed on behalf of an enterprise, a virtualization management system is often deployed to manage the various host devices powering the environment, the virtual machines (VMs) that are running on the environment, and the applications that are running on the VMs.

As the prevalence of virtualized computing environments grows, improving the uptime of the environment as well as systems that work with the environment is an increasing need. In prior-art systems, upgrading a virtualization management system involves potential downtime of the system because a new server process requires installation, migration of a database supporting the virtualization management system, and migration of the current state of the virtualization management system. A database schema of a new version of the virtualization management system may differ from the schema of the previous version of the virtualization management system. Compatibility with third party plugins or services may also vary.

Accordingly, the upgrade process for a virtualization management system that manages a virtualized computing environment can be a difficult process that may also encounter downtime of the environment. Therefore, examples of this disclosure introduce a mechanism to upgrade a virtualization management system by minimizing or eliminating downtime of the management system as well as the virtualized computing environment that the system manages. An example of a virtualization management system according to this disclosure includes VMware® vCenter Server, which can include a server that enables administrators to centrally manage virtual machines that are deployed across hosts within a virtualized computing environment.

Figure 1:
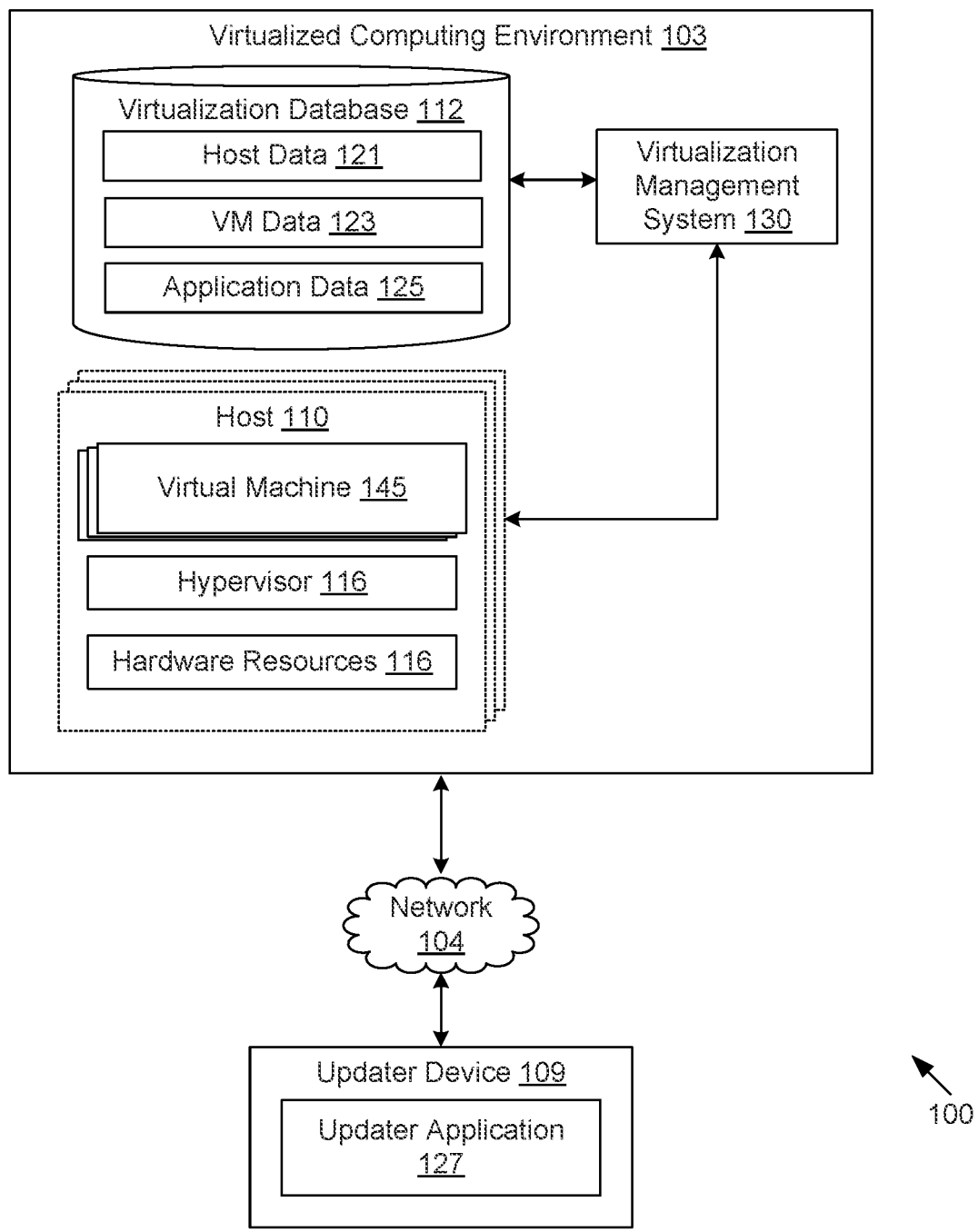
FIG. 1 is a block diagram of a virtualized computing environment according to various examples of the disclosure.

FIG. 1 is a block diagram of a networked environment 100 in which one or more embodiments of the present disclosure may be implemented. The networked environment 100 includes a virtualized computing environment 103, an updater client 106, and other systems that are in communication over a network 104. The network 104 can include, for example, wide area networks (WANs), local area networks (LANs), wired networks, wireless networks, other suitable networks, or any combination of two or more networks. For example, the network 104 can include satellite networks, cable networks, Ethernet networks, and other types of networks. The network 104 can also include a combination of two or more networks 104. Examples of networks 104 can include the internet, intranets, extranets, virtual private networks (VPNs), and similar networks.

In one embodiment, the virtualized computing system 103 can be a data center controlled and administrated by a particular enterprise or business organization. The virtualized computing system 103 can also include hardware resources that are operated by a cloud computing service provider and exposed as a service available to account holders, such as the enterprise in addition to other enterprises. As such, the virtualized computing system 103 can include an on-premise data center as well as an off-premise data center(s). In some embodiments, virtualized computing system 103 itself may be configured as a private cloud service provided by the enterprise.

Virtualized computing system 103 includes one or more hosts 110, which are also referred to as host devices or host computer systems. The virtualized computing system 103 and its hosts 110 can be deployed as a Vmware sSphere™ environment that delivers and powers a virtual infrastructure. Hosts 110 can be constructed on a server grade hardware platform, such as an x86 architecture platform. The hardware platform of each host 110 can include conventional components or hardware resources 116 of a computing device, such as one or more processors (CPUs), system memory, a network interface, storage, and other I/O devices. A host can include or be in communication with storage, such as local storage devices (e.g., one or more hard disks, flash memory modules, solid state disks, and optical disks)

and/or a storage interface that enables host 110 to communicate with one or more network data storage systems. Examples of a storage interface are a host bus adapter (HBA) that couples host 110 to one or more storage arrays, such as a storage area network (SAN) or a network-attached storage (NAS), as well as other network data storage systems.

The various components of hardware resources 116 of the hosts 110 can differ across different hosts 110. For example, the processor in one host 110 may belong to the Intel family of processors while the processor in a different host 110 may belong to the AMD family of processors. Processors may also differ in other ways, such as processor speed, architecture bit size, and in other ways.

Each host 110 is configured to provide a virtualization layer that abstracts processor, memory, storage, and networking resources of hardware platform into multiple virtualized execution contexts, which includes environments in which software, such as applications, may execute and be isolated from other software. Examples of virtualized execution contexts include virtual machines, containers (such as Docker containers), and other contexts. In some embodiments, the virtualized execution contexts are virtual machines 120 that can run concurrently on the same hosts. VMs 145 run on top of a software interface layer, referred to herein as a hypervisor 116, that enables sharing of the hardware resources of host 110 by VMs 145. One example of hypervisor 116 that may be used in an embodiment described herein is a VMware ESXi hypervisor provided as part of the VMware vSphere solution. Hypervisor 116 may run on top of the operating system of host 110 or directly on hardware components of host 110.

Virtualized computing system 103 includes a virtualization management module (depicted in FIG. 1 as virtualization management system 130) that can communicate with the plurality of hosts 110. In one embodiment, virtualization management system 130 is a computer program that resides and executes in a central server, which may reside in virtualized computing system 103, or alternatively, can run in a VM in one of hosts 110. One example of a virtualization management module is the vCenter Server™ product made available from VMware, Inc. The virtualization management system 130 is configured to carry out administrative tasks for the virtualized computing environment 103, including managing hosts 110, managing VMs 145 running within each host 110, provisioning VMs, migrating VMs from one host to another host, and load balancing between hosts 110.

In one embodiment, virtualization management system 130 can manage and integrate virtual computing resources provided by a third party cloud computing system with virtual computing resources of virtualized computing system 103 to form a unified "hybrid" computing platform.

The virtualized computing environment 103 can include a virtualization database 112. The virtualization database 112 can comprise a database that supports the virtualization management system 130 by storing information about the deployment of the hosts 110 and VMs 145 in the environment. The virtualization database 112 can include mass storage resources of the virtualized computing environment 103. The database can include one or more relational databases, such as a structured query language (SQL) database or a no-SQL database. The database can also include non-relational databases in some examples. The data stored in the virtualization database 112 can be associated with the operation of the various applications or functional entities described below.

The data stored in the virtualization database 112, for example, can include host data 121, VM data 123, application data 125, and other data. In the context of this disclosure, the virtualization database 112 can house information that facilitates the functioning of the virtualization management system 130. For example, the host data 121 can contain information about the hosts 110 that are managed by the virtualization management system 130. The information can include host CPU information, including a CPU frequency, CPU vendor, CPU thread information, information about the cores of host CPUs, and other CPU data. Host data 121 can also include data about PCI slots, bus data, host network configuration, disk resources, and other information about the hardware resources 116 of hosts 110 within the virtualized computing environment 103. Host data 121 can also include alarms or notifications that are attached to the hosts 110, information about the hypervisor 116 executed by a host 110, or other software aspects of the host configuration.

VM data 123 represents information about VMs that are executed by hosts 110 within the virtualized computing environment 103. VM data 123 can include allocated CPU, memory, and storage resources for the various VMs, network configuration for the VMs, or an operating system image for the VMs. VM data 123 can also include certificate data, encryption data, security credentials, or other data needed to configured and operate VMs within the virtualized computing environment 103. Application data 125 can represent information about applications, tasks, containers or other resources that are running on VMs within the virtualized computing environment 103 on behalf of an enterprise.

The updater device 109 can represent a computing device coupled to the network 104. The updater device 109 can be a processor-based computer system. According to various examples, an updater device 109 can be in the form of a desktop computer, a laptop computer, a personal digital assistant, a mobile phone, a smartphone, or a tablet computer system. The updater device 109 can execute an operating system, such as Windows™, Android™, or iOS®, and has a network interface to communicate with the network 104. The updater device 109 can execute an updater application 127 that can perform and orchestrate the updating and upgrading of the virtualization management system 130 according to examples of this disclosure. An administrator can initiate the upgrade process using the updater application 127, which can obtain an updated version of the virtualization management system 130 and install the updated version in connection with the virtualized computing environment 103.

The updater application 127 can upgrade or update the virtualization management system 130 by deploying a new instance of the virtualization management system 130 within the virtualized computing environment 130. The new instance of the virtualization management system 130 is deployed within the virtualized computing environment 103 or in another computing environment. The current instance of the virtualization management system 130 remains as the management system for the hosts 110 and VMs 145 in the environment. A snapshot of the current state of the virtualization management system 130 is captured and stored to one or more configuration or snapshot files. A database backup is created that reflects the current state of the virtualization database 112.

The snapshot reflecting the state of the virtualization management system 130 can be provided to the new instance of the virtualization management system 130. The updater application 127 can configure the new instance of the virtualization management system 130 with data in the snapshot so that the state of the new instance reflects the current state of the current instance of the virtualization management system 130. Additionally, the database backup that is created can be restored to the new instance of the virtualization management system 130 so that the virtualization database 112 assigned to the new instance reflects the state of the database that the current instance was relying upon. A database backup and restore is performed to account for potential schema updates that accompany a new version of the virtualization management system 130.

The new instance of the virtualization management system 130 can be initially deployed and assigned a temporary network address. The current instance of the virtualization management system 130 can remain as the management system for the virtualized computing environment 103 because the hosts 110, VMs 145, and other components of the virtualized computing environment 103 are configured to communicate with the network address of the current instance of the virtualization management system 130 until the new instance of the virtualization management system 130 is configured with the snapshot data and the data from the virtualization database 112 of the current instance.

Once the new instance of the virtualization management system 130 is configured with the snapshot data and a virtualization database 112 that reflects the data in the database for the current instance, the new instance of the virtualization management system 130 can be assigned the network address of the current instance. Assigning the new instance of the virtualization management system 130 the network address of the current instance in effect causes the new instance to take over as the management system for the virtualized computing environment 103.

Figure 2:
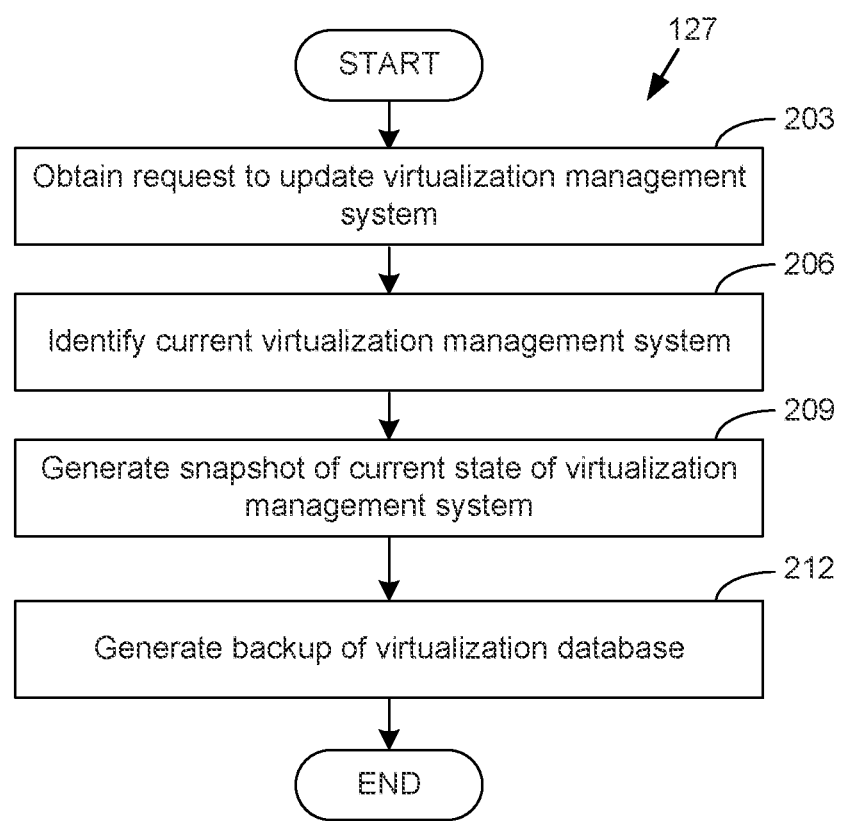
FIG. 2 is a flowchart illustrating how the updater application can capture the state of a virtualization management system according to various embodiments of the disclosure.

Referring to FIG. 2, shown is a flowchart showing an example operation of the updater application 127 generating a snapshot of a current instance of a virtualization management system 130. At step 203, the updater application 127 can obtain a request to update a current instance of a virtualization management system 130 that is managing a virtualized computing environment 103. The request can be received from an administrator through a user interface displayed on the updater device 109. The request can identify the current instance of the virtualization management system 130 through a network address, DNS name, or other mechanism to identify the correct instance of the virtualization management system 130. In some implementations, the updater application 127 can verify the credentials of the administrator as a user having authority to modify or update the virtualization management system 130 that is managing a particular virtualized computing environment 103. For example, the updater application 127 can verify that the user initiating an upgrade of the virtualization management system 130 belongs to an appropriate user group with a directory service, where only members of the user group are authorized to update the virtualization management system 130. The request to update the virtualization management system 130 can also identify or include one or more binaries, packages, or installation files that represents an updated version of the virtualization management system 130.

At step 206, the virtualization management system 130 can identify the current instance of the virtualization management system 130. The administrator can identify the current instance of the virtualization management system 130 through a network address, DNS name, or other mechanism to identify the correct instance of the virtualization management system 130 that the updater application 127 can update to a current or subsequent version of the virtualization management system 130. In some implementations, the updater application 127 can install a previous version of the virtualization management system 130 if an administrator desires to roll back the virtualization management system 130 to a previous version.

At step 209, the updater application 127 can generate a snapshot of the current state of the virtualization management system 130 that is managing the virtualized computing environment 103. The snapshot can be generated as a JavaScript Object Notation File, an XML file, or another format in which data structures can be represented. The snapshot file can capture the current state of the virtualization management system 130. In the case of a vCenter server, the snapshot file can identify versioning information about the current instance, a service state, a startup mode with which the server is configured, service health parameters, feature states for the various features provided by the server, the state of the hardware on which the server is running, information about third party plugins or services with which the server is configured, and information about tables within the virtualization database 112 assigned to the current instance of the virtualization management system 130. Once the snapshot file is generated, the updater application 127 can retain the file so that the new instance of the virtualization management system 130 can be configured with information within the snapshot file.

The updater application 127 can obtain the data necessary to populate the snapshot file by communicating with an API provided by the virtualization management system 130. The API can allow the updater application 127 to query the current state of the virtualization management system 130 to retrieve real-time status information about the current state of the virtualization management system 130.

At step 212, the updater application 127, can generate a backup database of the virtualization database 112. As noted above, virtualization database 112 can implemented on a database architecture such as a SQL or noSQL database system. The database can generate a backup from which a new database can be generated or restored. Accordingly, rather than simply pointing a new instance of the virtualization management system 130 to the virtualization database 112, a newly created database can be used in the event of the database schema utilized by the new version of the virtualization management system 130 varying from the schema utilized by a previous version of the database. Accordingly, the database can be restored according to a potentially different schema to avoid database interoperability issues. Thereafter, the process proceeds to completion.

Figure 3:
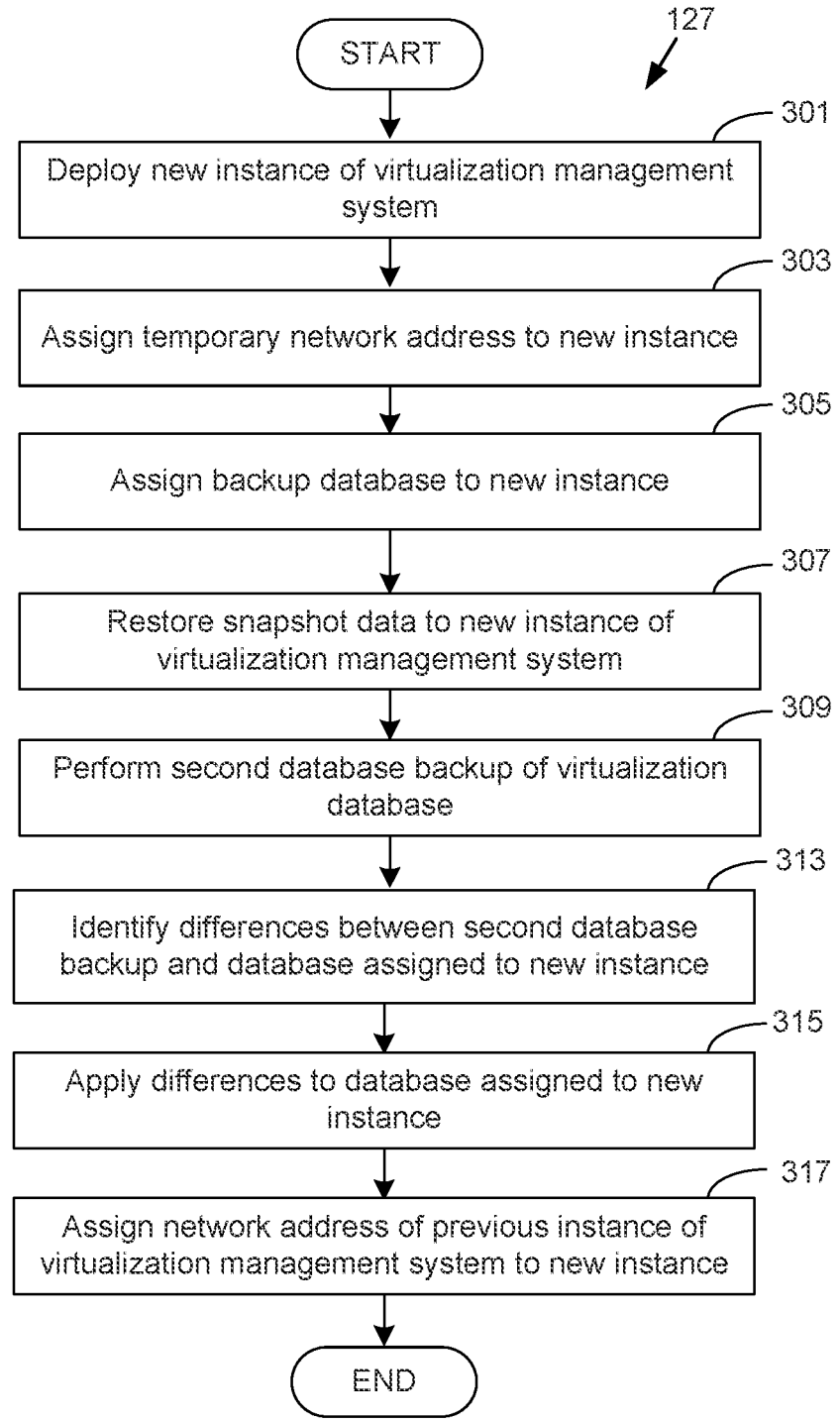
FIG. 3 is a flowchart illustrating how the updater application can deploy a new instance of the virtualization management system according to various embodiments of the disclosure.

Referring to FIG. 3, shown is a flowchart showing an example operation of the updater application 127 executing a new instance of a virtualization management system 130 and replacing the current instance of the virtualization management system 130 with the newly executed instance. First, at step 301, the updater application 127 can deploy a new instance of the virtualization management system 130. The new instance can be a subsequent or updated version compared to the current instance of the virtualization management system 130 that is currently acting as the management system of the virtualized computing environment 103. The new instance can be deployed using an open virtualization format (OVF) standard for packaging and distributing the virtualization management system 130 on a VM 145 within the virtualized computing environment 103. The new instance does not necessarily have to be executed on the same host 110 as the current instance of the virtualization management system 130. The new instance of the virtualization management system 130 can be deployed by the updater application 127 without firstboot of the various services on the virtualization management system 130.

At step 303, the updater application 127 can assign the virtualization management system 130 a temporary network address that is different from the current instance of the updater application 127. The updater applications 127 can assign a temporary network address because at this point in the process, the new instance of the virtualization management system 130 has not been configured to take over management of the virtualized computing environment 103. Therefore, the new instance of the virtualization management system 130 can be accessed by the updater application 127 at the temporary network address until the new instance is configured to assume management of the virtualized computing environment 103.

At step 305, the updater application 127 can assign the backup database that was generated from the virtualization database 112 to the new instance. The backup database can be assigned to the new instance by restoring the database using a potentially different schema that is specified for the version of the new instance of the virtualization management system 130. The database can be restored utilizing a database restore functionality provided by the database architecture that is used to implement the virtualization database 112. For example, a SQL server can be equipped with a restore command that allows data and transactions within the database to be restored into a newly created database. In some implementations, upon restoration of the backup database, firstboot of services on the new instance of the virtualization management system 130 can occur.

At step 307, the updater application 127 can apply the settings stored in the snapshot file to the new instance of the virtualization management system 130. The updater application 127 can also validate the settings and inventory data stored within the snapshot file. The updater application 127 can validate the data in the snapshot file by determining whether they are consistent with a format and schema specified by the new version of the virtualization management system 130 that is being deployed.

At step 309, the updater application 127 can perform a second database backup of the virtualization database 112 that corresponds to the current instance of the virtualization management system 130. As noted above, virtualization database 112 can implemented on a database architecture such as a SQL or noSQL database system. The database can generate an additional backup to account for changes made to the database by the current instance of the virtualization management system 130 since the initial database backup was performed. Because the current instance of the virtualization management system 130 is still deployed and managing the virtualized computing environment 103, changes to the database may have occurred. Accordingly, a second backup of the database can ensure that there is no data loss once the new instance is deployed as the management system of the environment.

At step 313, the updater application 127 can identify the differences between the second backup database and the initial backup database that was generated and assigned to the new instance of the virtualization management system 130. In other words, the updater application 127 can perform a delta between the second backup database and the database that was assigned to the new instance at step 305. By identifying the differences between the second backup database and the database assigned to the new instance, the updater application 127 can ensure that no data loss occurs in the virtualization database 112 once the new instance takes over management of the virtualized computing environment 103.

At step 315, the updater application 127 can apply the differences identified between the second backup database and the database assigned to the new instance to the database. Again, because the current instance of the virtualization management system 130 is still deployed and managing the virtualized computing environment 103, changes to the database may have occurred. Accordingly, a second backup of the database can help ensure that there is no data loss once the new instance is deployed as the management system of the virtualized computing environment 103.

At step 317, the updater application 127 can assign the new instance of the virtualization management system 130 the network address of the current instance of the virtualization management system 130. In some examples, the updater application 127 can also assign the current instance of the virtualization management system 130 the temporary network address that was previously assigned to the new instance of the virtualization management system 130. In other examples, the updater application 127 can assign the current instance of the virtualization management system 130 another temporary network address.

By assigning the new instance of the virtualization management system 130 the network address that was previously assigned to the current instance, the updater application 127 has in effect replaced the current instance of the virtualization management system 130 with the new instance. The network address can comprise an IP address, a DNS name, or other mechanism with which nodes 110 or VMs 145 can address or communicate with the virtualization management system 130. By assigning the new instance of the virtualization management system 130 the network address that was previously assigned to the current instance of the virtualization management system 130, the virtualization management system 130 has effectively been upgraded without incurring downtime on the virtualization management system 130 or the virtualized computing environment 103.

Functionality attributed to the management application 106 can be implemented in a single process or application or in multiple processes or applications. The separation or segmentation of functionality as discussed herein is presented for illustrative purposes only.

The flowcharts of FIGS. 2-3 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The virtualized computing environment 103 and the updater devices 109 or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the updater application 127 and/or other components can be stored in one or more storage devices and be executable by one or more processors. Also, a data store can be stored in the one or more storage devices.

The updater application 127, management application 106, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in at least one computing device or by using multiple computing devices.

As used herein, "about," "approximately," and the like, when used in connection with a numerical variable, can generally refers to the value of the variable and to all values of the variable that are within the experimental error (e.g., within the 95% confidence interval for the mean) or within +/−10% of the indicated value, whichever is greater.

Where a range of values is provided, it is understood that each intervening value and intervening range of values, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A system for providing an enterprise-specific neural network model to a client device, comprising:
   a computing device that comprises a processor and a memory; and
   program instructions executable in the computing device that, when executed by the processor, cause the computing device to at least:
      identify a current instance of a virtualization management system based on a network address of the current instance of the virtualization management system;
      deploy a new instance of the virtualization management system, the new instance comprising a different version relative to the current instance of the virtualization management system;
      assign a temporary network address to the new instance that is different from the network address of the current instance, wherein the new instance is network accessible to the computing device by way of the temporary network address;
      apply a plurality of configuration options to the new instance from the current instance;
      apply to a new database at least one change that occurred to a current database since a database backup was generated; and
      replace the temporary network address of the new instance with the network address of the current instance following the application of the at least one change to the new database.

2. The system of claim 1, wherein the new instance of the virtualization management system is at least one of a previous version, a subsequent version, or an updated version of the virtualization management system.

3. The system of claim 1, wherein the virtualization management system manages a plurality of host machines executing a plurality of virtual machines.

4. The system of claim 1, wherein the plurality of configuration options are determined from a snapshot of a current state of the current instance of the virtualization management system.

5. The system of claim 4, wherein the snapshot is generated in a JavaScript Object Notation file.

6. The system of claim 1, wherein the program instructions apply to the new database the at least one change that occurred to the current database since the database backup was generated by:
   identifying at least one difference between the database backup and the new database.

7. A method comprising:
   identifying, via a computing device, a current instance of a virtualization management system based on a network address of the current instance of the virtualization management system;

deploying, via the computing device, a new instance of the virtualization management system, the new instance comprising a different version relative to the current instance of the virtualization management system;

assigning, via the computing device, a temporary network address to the new instance that is different from the network address of the current instance, wherein the new instance is network accessible to the computing device by way of the temporary network address;

applying, via the computing device, a plurality of configuration options to the new instance from the current instance;

applying, via the computing device, to a new database at least one change that occurred to a current database since a database backup was generated; and replacing, via the computing device, the temporary network address of the new instance with the network address of the current instance following the application of the at least one change to the new database.

8. The method of claim 7, wherein the new instance of the virtualization management system is at least one of a previous version, a subsequent version or an updated version of the virtualization management system.

9. The method of claim 7, wherein the virtualization management system manages a plurality of host machines executing a plurality of virtual machines.

10. The method of claim 7, wherein the plurality of configuration options are determined from a snapshot of a current state of the current instance of the virtualization management system.

11. The method of claim 10, wherein the snapshot is generated in a JavaScript Object Notation file.

12. The method of claim 7, wherein applying to the new database the at least one change that occurred to the current database since the database backup was generated by identifying at least one difference between the database backup and the new database.

13. An updater device, comprising:

a computing device that comprises a processor and a memory; and machine instructions stored in the memory that, when executed by the processor, the machine instructions cause the computing device to at least:

identify a current instance of a virtualization management system based on a network address of the current instance of the virtualization management system;

deploy a new instance of the virtualization management system, the new instance comprising a different version relative to the current instance of the virtualization management system;

assign a temporary network address to the new instance that is different from the network address of the current instance, wherein the new instance is network accessible to the computing device by way of the temporary network address;

apply a plurality of configuration options to the new instance from the current instance;

apply to a new database at least one change that occurred to a current database since a database backup was generated; and replace the temporary network address of the new instance with the network address of the current instance following the application of the at least one change to the new database.

14. The updater device of claim 13, wherein the new instance of the virtualization management system is at least one of a previous version, a subsequent version, or an updated version of the virtualization management system.

15. The updater device of claim 13, wherein the virtualization management system manages a plurality of host machines executing a plurality of virtual machines.

16. The updater device of claim 13, wherein the plurality of configuration options are determined from a snapshot of a current state of the current instance of the virtualization management system.

17. The updater device of claim 16, wherein the snapshot is generated in a JavaScript Object Notation file.

18. The updater device of claim 17, wherein the machine instructions apply to the new database the at least one change that occurred to the current database since the database backup was generated by:

identifying at least one difference between the database backup and the new database.

\* \* \* \* \*